(12) United States Patent
Singer et al.

(10) Patent No.: US 10,571,321 B2
(45) Date of Patent: Feb. 25, 2020

(54) DEVICE FOR MEASURING FLUID PARAMETERS, A METHOD FOR MEASURING FLUID PARAMETERS AND A COMPUTER PROGRAM PRODUCT

(71) Applicant: Fugro Technology B.V., Leidschendam (NL)

(72) Inventors: Johannes Maria Singer, Leidschendam (NL); Devrez Mehmet Karabacak, Leidschendam (NL)

(73) Assignee: Fugro Technology B.V. (NL)

( * ) Notice: Subject to any disclaimer, the term of this patent is extended or adjusted under 35 U.S.C. 154(b) by 0 days.

(21) Appl. No.: 15/558,686

(22) PCT Filed: Mar. 24, 2016

(86) PCT No.: PCT/NL2016/050206
§ 371 (c)(1),
(2) Date: Sep. 15, 2017

(87) PCT Pub. No.: WO2016/153352
PCT Pub. Date: Sep. 29, 2016

(65) Prior Publication Data
US 2018/0113014 A1    Apr. 26, 2018

Related U.S. Application Data

(60) Provisional application No. 62/137,859, filed on Mar. 25, 2015.

(30) Foreign Application Priority Data

Mar. 25, 2015   (NL) ..................................... 2014518

(51) Int. Cl.
*G01F 1/84*     (2006.01)
*G01L 1/24*     (2006.01)

(52) U.S. Cl.
CPC .......... *G01F 1/8427* (2013.01); *G01F 1/8477* (2013.01); *G01L 1/242* (2013.01); *G01L 1/246* (2013.01)

(58) Field of Classification Search
CPC ................. G01F 1/84; G01F 1/66; G01F 1/32
See application file for complete search history.

(56) References Cited

U.S. PATENT DOCUMENTS 4,722,603 A * 2/1988 Graebner ................ E21B 47/04
                                                      356/477
5,038,620 A * 8/1991 Rogers, Jr. ............. G01F 1/8413
                                                      250/227.16

(Continued)

FOREIGN PATENT DOCUMENTS

DE   102008023056 A1   11/2009
EP        275367 A2    7/1988

(Continued)

OTHER PUBLICATIONS

English abstract of DE102008023056; retrieved from www.espacenet.com on Dec. 13, 2017.

(Continued)

*Primary Examiner* — Jewel V Dowtin
(74) *Attorney, Agent, or Firm* — Polsinelli PC

(57) ABSTRACT

The invention relates to a device for measuring fluid parameters, comprising a Coriolis flow meter. The meter comprises a flow tube and an actuator forcing the flow tube into vibration and/or rotation. Further, the meter comprises a displacement sensor for sensing a displacement of the flow tube. The displacement sensor is arranged for measuring an optical fiber length change.

19 Claims, 5 Drawing Sheets

(56) References Cited

U.S. PATENT DOCUMENTS

| | | | | |
|---|---|---|---|---|
| 5,379,649 | A * | 1/1995 | Kalotay | G01F 1/8413 73/657 |
| 5,400,653 | A | 3/1995 | Kalotay | |
| 6,009,216 | A * | 12/1999 | Pruett | E21B 17/206 219/502 |
| 6,722,209 | B1 | 4/2004 | Fan et al. | |
| 6,870,975 | B1 * | 3/2005 | Morison | G01D 5/35303 356/480 |
| 7,117,751 | B2 | 10/2006 | Berger et al. | |
| 7,281,415 | B2 * | 10/2007 | Johansen | E21B 47/10 73/61.45 |
| 7,340,965 | B2 * | 3/2008 | Mehendale | G01F 1/8409 73/861.355 |
| 7,437,949 | B2 * | 10/2008 | Nakao | G01F 1/8409 73/861.355 |
| 7,603,885 | B2 * | 10/2009 | Baker | G01F 1/8413 73/1.16 |
| 7,930,115 | B2 * | 4/2011 | Gonia | G01F 15/063 702/50 |
| 8,452,142 | B1 * | 5/2013 | Laws | G02B 6/4401 385/101 |
| 8,904,879 | B2 * | 12/2014 | Fernandes | G01F 1/3263 250/227.14 |
| 9,134,160 | B2 * | 9/2015 | Ahmad | G01F 1/74 |
| 2004/0042703 | A1 * | 3/2004 | Deaton | E21B 47/06 385/12 |
| 2005/0150311 | A1 | 7/2005 | Berger et al. | |
| 2007/0230861 | A1 * | 10/2007 | Khrushchev | G01L 1/246 385/13 |
| 2008/0271926 | A1 * | 11/2008 | Coronado | E21B 17/026 166/66 |
| 2011/0102767 | A1 * | 5/2011 | Volanthen | G01R 29/0842 356/32 |
| 2013/0319133 | A1 * | 12/2013 | Lubbers | G01F 1/3263 73/861.49 |
| 2014/0198823 | A1 * | 7/2014 | Duncan | G01K 11/32 374/161 |
| 2015/0323558 | A1 * | 11/2015 | Cranch | G01D 5/266 356/28.5 |
| 2017/0052050 | A1 * | 2/2017 | Crickmore | E21B 47/065 |
| 2017/0138805 | A1 * | 5/2017 | Jiang | G01L 1/242 |
| 2017/0139076 | A1 * | 5/2017 | van Oort | G01L 1/246 |
| 2017/0260849 | A1 * | 9/2017 | Friehauf | E21B 47/123 |
| 2018/0136058 | A1 * | 5/2018 | Singer | G01L 5/166 |
| 2018/0171778 | A1 * | 6/2018 | Hoehn | G01D 5/35374 |
| 2018/0216979 | A1 * | 8/2018 | Ainger | G01L 11/025 |
| 2018/0283969 | A1 * | 10/2018 | Wang | G01L 11/02 |
| 2018/0347347 | A1 * | 12/2018 | Bakulin | G01V 1/42 |
| 2018/0356262 | A1 * | 12/2018 | Cheng | G02B 6/02076 |

FOREIGN PATENT DOCUMENTS

| | | |
|---|---|---|
| EP | 0619013 B1 | 7/1998 |
| JP | 58206924 A | 12/1983 |
| WO | 9313391 A1 | 7/1993 |
| WO | 2006074107 A1 | 7/2006 |

OTHER PUBLICATIONS

International Search Report and Written Opinion; PCT Application No. PCT/NL2016/050206; dated Aug. 30, 2016.

"Fibre-Optic Coriolis Mass Flowmeter for Liquids", Electronic Letters, IEE Stevenage, GB, vol. 24, No. 13, Jun. 23, 1988, pp. 783-785, XP000026992, ISSN: 0013-5194.

Bojan M. Dakic et al: "A Novel Fiber-Optic Mass Flow Sensor", Key Engineering Materials, vol. 543, Mar. 11, 2013, pp. 231-234, XP055229719, DOI: 10.4028/www.scientific.net/KEM.543.231.

* cited by examiner

DEVICE FOR MEASURING FLUID PARAMETERS, A METHOD FOR MEASURING FLUID PARAMETERS AND A COMPUTER PROGRAM PRODUCT

CROSS-REFERENCE TO RELATED APPLICATIONS

This application is a national stage application of International Application No. PCT/NL2016/050206 filed Mar. 24, 2016 which claims benefit to Netherlands Application No. 2014518 filed Mar. 25, 2015 and U.S. Provisional Application No. 62/137,859 filed Mar. 25, 2015, each of which is incorporated by reference in their entireties.

FIELD OF TECHNOLOGY

The invention relates to a device for measuring fluid parameters, comprising a Coriolis flow meter, comprising a flow tube and an actuator forcing the flow tube into vibration and/or rotation, further comprising a displacement sensor for sensing a displacement of the flow tube.

BACKGROUND

In various industrial machinery, there exists an important need to know accurately the mass flow in various processes, i.e. engine performance monitoring and optimization, process or production control, metering applications. A relevant application is the (petro)chemical industry, e.g. refineries, wherein large amounts of liquid flow between different process units that are dispersed over a large area and exposed to harsh environments often require constant monitoring from a centralized control room.

This is of specific interest to the maritime industry. In recent years, emissions requirements have become stricter. This trend will likely continue with governments looking to further reduced emissions from marine vessels in an effort to minimize the industry's environmental impact.

In order to further reduce emissions it is necessary to perform engine performance monitoring and optimization. Such techniques rely on accurate flow measurements in the fuel supply process.

The Coriolis effect is a widely known effect that can be used, e.g., for highly accurate measurement of flow parameters to be extracted accurately, such as mass flow rate, density, and volume flow rate. Its advantages include the ability to measure mass flow rate directly, as opposed to volume flow rate, and therefore being independent of the fluctuations in density, i.e. due to temperature variations or chemical composition changes. The devices to measure different parameters of a fluid flowing through a pipe by using the Coriolis Effect will be described herein as Coriolis flow meters.

Basically, Coriolis flow meters function on the principle of oscillating a (pair of) pipe(s) and measuring the oscillation amplitude, frequency and phase at different locations of the pipe and correlating that to the mass flow rate and fluid density.

In practice, Coriolis flow meters are implemented using a single pipe oscillating relative to reference frame, using double oscillating pipes with parallel flows with preferably 180° phase difference between the oscillations induced in the pipes, using double oscillating pipes with anti-parallel flow, in phase oscillations, using various alternative geometric arrangements of pipes such as a straight, a curved, a U-shaped, a V-shaped, a triangle-shaped, an Omega-shaped, a S-shaped or a Z-shaped pipe, or using rotating pipes.

Generally, a Coriolis force results in the effect of a mass moving in an established direction and then being forced to change direction with a vector component normal to the established direction of flow. In a vibrating system the direction change is constantly varying. Hence the Coriolis force is also constantly changing. A dynamic twisting motion occurs in addition to the oscillating motion, caused by the vibrating action. By measuring this twisting motion, a mass flow measurement can be obtained.

Typically, this measurement is made by sensors, which are placed at locations on the tube where the displacement variation in the tube due to the Coriolis force is the greatest. Two data values are derived from the sensor measurement. First a phase lag between one location of the tube and another location of the tube is calculated whereby the first and second locations of measurement are selected by having a difference in angular velocity with respect to the flow directions in the said two locations, such that a difference in Coriolis force at the said locations is different. This is indicative of the relative mass flow. Additionally, the resonant frequency of tube relates to the relative density of the measured material. Generally these measurements are temperature compensated.

Coriolis flow meters utilizing electrical detection systems suffer from some of the known limitations of electrical sensors. Namely, effects from electrical signal cross-talk, electromagnetic fields, limitations in operation conditions such as temperature, need for local and high accuracy signal processing for ensuring high meter accuracy. Especially the latter need for high accuracy localized signal processing for each unit results in high cost for each measurement point.

Furthermore, conditions in a fuel supply system may be hazardous. The flow meters and sensing electronics may be exposed to high temperatures and hazardous/corrosive fluids. In certain application, the sensing electronics may form an explosion hazard.

It is noted that patent publications U.S. Pat. Nos. 7,117,751 and 6,722,209 disclose a Coriolis flow meter wherein an optical read-out is realized using free-space detection techniques such as a Fabry-Perot interferometer or by detecting the tube in a light path or with quadrant detection. In practice, free space optics solutions suffer from a need for high precision high stability alignment of various optical components. These components are prone to contamination in an environment that either interferes with the guided light or results in contamination forming on the reflective or transmitting surfaces resulting in optical signal loss and drift over time.

Also, Coriolis flow meters are known wherein a fiber is attached in bent shape between an oscillating pair of tubes such that the distance change between the two pipes results in a change of the bend radius of the fiber which is then detectable through the change in optical transmission. However, optical transmission loss measurements are very inaccurate. Additionally, in order to analyze optical transmission loss, it is necessary to obtain well-correlated information regarding the optical source output power level and the power losses along the transmission fibers.

SUMMARY

It is an object of the invention to provide a device for measuring fluid parameters, comprising a Coriolis flow meter wherein at least one of the above-identified disadvantages is reduced. Thereto, according to an aspect of the invention, a device is provided for measuring fluid parameters, comprising a Coriolis flow meter according to the preamble is provided, wherein the displacement sensor is arranged for measuring an optical fiber length change.

By arranging the displacement for measuring a fiber length change using a strain sensitive optical fiber such as a FBG-based sensor a number of advantages are obtained, including an insensitivity to electric oscillation drive effects, an insensitivity to induction effects potentially caused by conducting fluid inside the pipe, an insensitivity to electromagnetic noise in the installation environment such as a ship, a factory or an engine room, and an ability to interrogate oscillations remotely from large distance such that one central data processing and recording point at a remote location can be used. A central data processing and recording system can interrogate multiple Coriolis flow meters or any other strain-based optical sensor, e.g. up to 25 sensing points, resulting in major cost savings.

In a particular embodiment, a strain sensitive optical fiber such as a FBG-based sensor can be used for measuring a fiber length change. In another embodiment, the displacement sensor is arranged for measuring the optical path length change in the fiber using interferometric measurement techniques.

Further, differential measurements can be performed directly by use of identical sensors near both flow inlet and outlet points of the Coriolis meter system from one central data processing point providing auto calibrated phase difference measurement which results in improved differential flow accuracy compared to individual measurements. In addition, drift, calibration and cross-correlation with changes elsewhere in the sensor network can be monitored in a central point. Also, fiber length change measurements using optical fiber technology is robust to optical transmission losses, less influenced by external fibers and mostly immune to external effects.

Commonly, sensing using an optical fiber is hindered by the fact that the force that needs to be detected is miniscule and the stretching generated in a material as hard as glass is found to be limited. However, according to an aspect, this challenge may be overcome by use of thinned down fiber in combination with a high rigidity flow pipe, whereby the rigidity of the fiber becomes negligible compared to the rigidity of the flow pipe and even small motions of the pipe get transferred to the fiber identically.

In a further embodiment, due to the large scale mismatch in some applications between the length scale of the pipes and the fibers it is preferred to focus the motion of the pipe to a small section of the detection fiber. This can be achieved by a diameter change in connected fiber section whereby the diameter of the fiber is reduced, e.g. up to a range of circa 30 to circa 125 µm) over a short distance, such as circa 2-20 mm in length, in comparison to the rest of the connected fiber having a larger thickness, e.g. in a range from circa 125 to circa 2000 µm. This can be achieved by reduction of the fiber diameter by chemical or mechanical etching or by tapering in a thermal treatment. It can also be achieved by inserting an already thin fiber, e.g. in a range of circa 30 to circa 125 µm in diameter, in a glass tube or capillary with a considerably larger outer diameter and wall thickness. In a preferred approach, the gap between the fiber and the glass capillary should be minimal and filled preferably with a high modulus of elasticity material that is preferably the same chemistry as the fiber coating. This approach ensures that the total motion of the pipe results in a stretching of the thinned section.

The above diameter change is especially advantageous in Fiber Bragg Grating based sensors wherein the grating lengths are often limited by fiber manufacturing processes to circa 2-20 mm and the obtained spectral shift is proportional to strain over the grating, which is effectively total length change of the grating divided by the original grating length.

By providing a measurement setup for measuring a fiber length change, e.g. a strain-based solution, a reproducible and controllable measurement system is provided with inherent high accuracy performance and without the need to provide information regarding the optical source.

Further, an approach wherein a fiber length change is measured can be multiplexed such that multiple measurement points can be on one fiber with each point well identified in position. In addition, other sensor may be added to the single fiber. For example, a fiber optic accelerometer, a pressure sensor or a fiber-optic temperature sensor may be added to the sensing chain. In many flow applications, measurement of flow pressure is especially of value and fiber optic pressure gauges can be integrated in the same fiber to allow for local pressure measurements via ports on the pipe.

The principle of measuring a fiber length change allows for more accurate cancellation/correction of temperature induced effects, for example on FBG strain sensors, as reference points the same temperature sensitivity can easily be positioned in close proximity. Furthermore, extraction of local temperature information of the flow can assist in determining the correlations with density change recorded from the vibration characteristics of the pipe to understand whether changes in the fluid density are from impurities or chemical variations or from temperature change.

Measurement of multiple sensors, including Coriolis flow meters and/or other sensors, on one platform, using a single fiber provides the advantage to enable interrogating all fuel flow sensors on a vessel with one interrogation unit. Or, it may be possible to interrogate the flow sensors and other vessel sensors with the same interrogation unit.

The invention also relates to a method for measuring fluid parameters in a flow tube of a Coriolis flow meter, the method comprising a step of sensing a displacement of the flow tube using a displacement sensor, wherein the displacement sensing step includes measuring a fiber length change.

Optionally, the method may further comprise the step of forcing the flow tube of the Coriolis flow meter into vibration and/or rotation.

Optionally, the fluid parameters may include volume flow, mass flow, and/or density.

If the method for measuring fluid parameters includes measuring mass flow, the method may further comprise forcing the flow tube into vibration and/or rotation. Additionally, the step of sensing a displacement of the flow tube using a displacement sensor wherein the displacement sensing step includes measuring a fiber length change includes measuring displacement between a first location on the flow tube relative to a second location on the flow tube. The method may further include the step of correlating the measured relative displacement to determine the mass flow. Thus mass flow of the fluid flowing in the Coriolis meter is determined on the basis of the measured relative displacement.

If the method relates to measuring density, the method may further comprise forcing the flow tube into vibration and/or rotation; and subsequently ceasing to force the flow tube into vibration and/or rotation. It will be appreciated the flow tube may be forced into vibration and/or rotation for a predetermined period of time. For example the flow tube may be forced into vibration by an impulse or by vibrating the flow tube for several seconds, for example 10 seconds. The method may further include determining the ringdown frequency on the basis of the sensed displacement of the flow tube using the displacement sensor, wherein the displacement sensing step includes measuring a fiber length change. Ringdown frequency corresponds to a resonant frequency of the flow tube. Additionally, the method may further comprises correlating the determined ringdown frequency to determine the density. Thus density of the fluid flowing in the Coriolis meter is determined on the basis of the determined ringdown frequency.

Alternatively or additionally, if the method relates to measuring density the method may comprise for each predetermined frequency of a plurality of predetermined frequencies; forcing the flow tube into vibration and/or rotation at the predetermined frequency; sensing a displacement of the flow tube using a displacement sensor, wherein the displacement sensing step includes measuring a fiber length change; determining the predetermined frequency at which the displacement of the flow tube was at its maximum. This is referred to as the highest amplitude or peak amplitude. The method may further comprise correlating the predetermined frequency corresponding to the peak displacement to determine density. Thus density of the fluid flowing in the Coriolis meter is determined on the basis of the predetermined frequency corresponding to the peak displacement of the flow tube. The plurality of predetermined frequencies may correspond to a frequency sweep for a range of frequencies at a given interval.

In this way density may be obtained according to an alternative method. The method my include using both method to provided a more reliable measurement or a single method.

In the case that the method relates to measuring volume flow, then the method comprises measuring mass flow on the basis of the sensed displacement of the flow tube using a displacement sensor, wherein the displacement sensor step includes measuring a fiber length change; measuring density on the basis of the sensed displacement of the flow tube using a displacement sensor, wherein the displacement sensing step includes measuring a fiber length change; measuring volume flow on the basis of the measured mass flow and the measured density Further, the invention relates to a computer program product. A computer program product may comprise a set of computer executable instructions stored on a data carrier, such as but not limited to a flash memory, a CD or a DVD. The set of computer executable instructions, which allow a programmable computer to carry out the method as defined above, may also be available for downloading from a remote server, for example via the Internet, e.g. as an app.

BRIEF DESCRIPTION OF THE DRAWINGS

Other advantageous embodiments according to the invention are described in the following claims.

By way of example only, embodiments of the present invention will now be described with reference to the accompanying figures in which.

The figures merely illustrate preferred embodiments according to the invention. In the figures, the same reference numbers refer to equal or corresponding parts.

DETAILED DESCRIPTION

Figure 1:
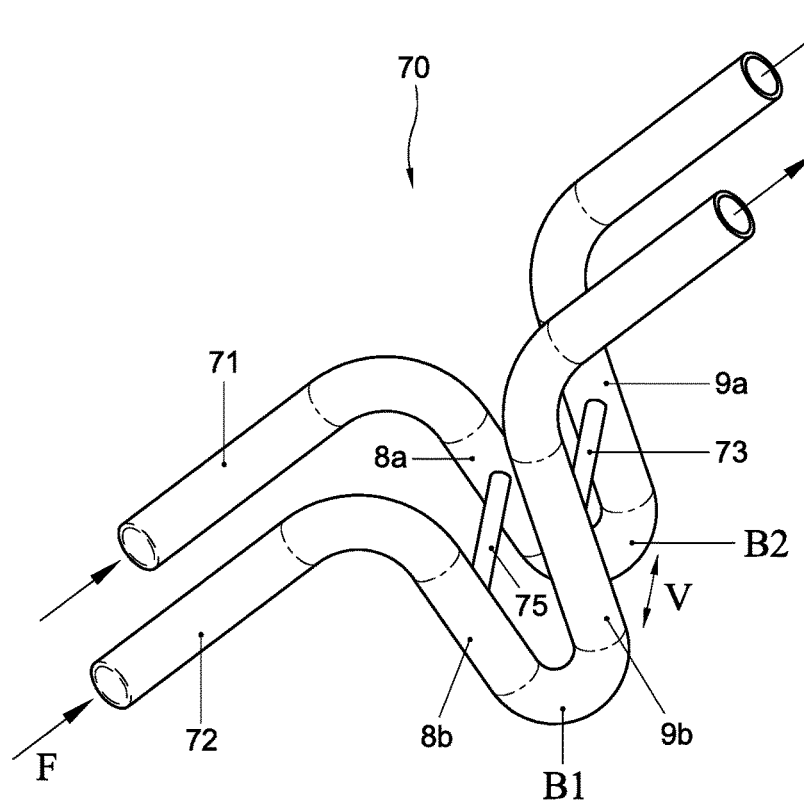
FIG. 1 shows a schematic perspective view of a device for measuring fluid parameters comprising a Coriolis flow meter.

FIG. 1 shows a schematic perspective view of a device 70 for measuring fluid parameters comprising a Coriolis flow meter. As shown, the flow meter includes two U-shaped tubes 71, 72 having equal flow rates in parallel directions F. The flow meter further includes an actuator (not shown) forcing the two tubes 71, 72 to vibrate anywhere within the U-shape elbow B1, B2 of the tubes 71, 72. In the shown setup, measurement locations 8a, 8b, 9a, 9b are provided at two parallel locations, upstream and downstream to the vibration actuation locations B1, B2, in the respective elbows of each tube 71, 72.

In the embodiment shown in FIG. 1, the flow tubes are preferably oscillated with 180° phase difference in the vibration induced in between the pipes. Also other flow tube configurations can be applied, i.e. using double oscillating pipes with anti-parallel flow, in phase oscillations or using other flow tube geometries, e.g. a straight, a curved, a U-shaped, a V-shaped, a triangle-shaped, an Omega-shaped, a S-shaped or a Z-shaped pipe, or using rotating pipes.

Figure 2:
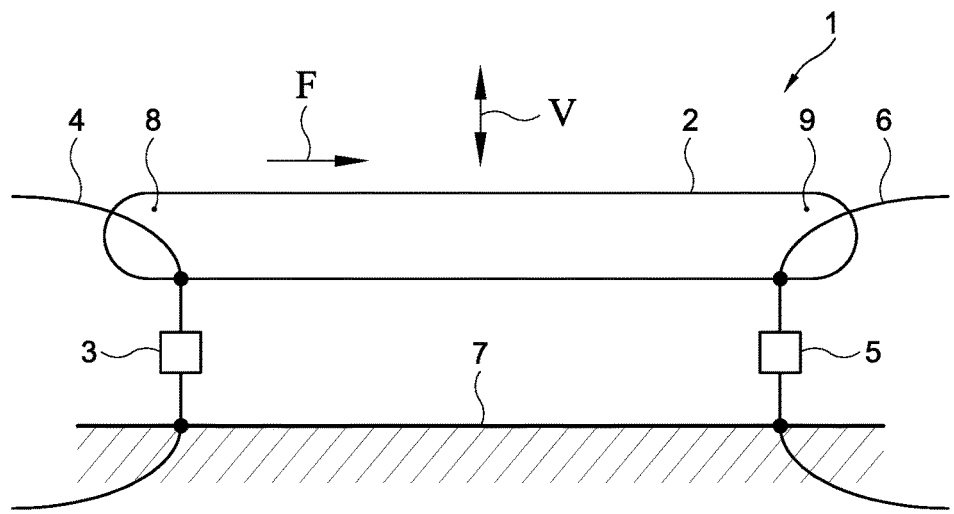
FIG. 2 shows a schematic view of a device according to a first embodiment of the invention.

FIG. 2 shows a schematic view of a device 70 for measuring fluid parameters, comprising a Coriolis flow meter 1 according to a first embodiment of the invention. The schematic view is actually a top view of a central part of a single tube of the device shown in FIG. 1. However, also a single straight tube with a flow in one or another direction may be formed as depicted in FIG. 2. The meter 1 is arranged for measuring flow parameters. The meter 1 comprises a single flow tube 2 and a vibration actuator (not shown) forcing the flow tube 2 into vibration. The meter 1 further comprises a displacement sensor for sensing a displacement of the flow tube 2. The displacement sensor is arranged for measuring an optical fiber length change, and includes a strain sensitive optical fiber implemented as a Fiber Bragg Grating (FBG) fiber 3. The FBG fiber 3 is integrated in a transmission fiber 4 so that the spectrum of the FBG fiber 3 can be scanned, locally or remotely.

The FBG fiber is used to detect an oscillation frequency, amplitude and/or phase of the flow tube 2 at a particular location, preferably at a location where the displacement difference due to the Coriolis force between two measurements points has a maximum. Generally, an oscillation frequency, amplitude and/or a phase at a single or a multiple number of measurement points are obtained. It is noted that, in principle, any other strain sensitive optical fiber can be applied, including a multicore fiber, a birefringent fiber, a distributed sensing fiber e.g. based on Brillouin scattering detection, a fiber laser etc. The fiber functionally exhibits a change in optical reflection or transmission spectrum in response to a change in its length.

In the embodiment shown in FIG. 2, two displacement sensors including an FBG fiber 3, 5, integrated in corresponding transmission fibers 4, 6, are provided, each located at a measurement location 8, 9 of the flow tube 2, preferably on an exterior wall of the flow tube 2. Then, the strain sensitive optical fibers 3, 5 are fixed to opposite measurement location 8, 9 of the flow tube 2, e.g. directly on the outer surface of the flow tube 2. The fibers 3, 5 are spanned between the measurement locations 8, 9 of the flow tube 2 on the one hand, and the fixed world 7 on the other hand. The actuator may be positioned in the middle of the flow tube 2 so that the largest vibration phase difference is realized between the measurement points. During operation, the flow tube 2 is vibrated in a direction V transverse to a flow direction F. This results in Coriolis forces of different phase and amplitude to appear at different locations, for example locations 8, 9 of the flow tube 2, of the pipe depending on its shape. Then, the measurement location 8, 9 of the flow tube 2 are stretched in different amounts at any given moment. The stretch difference can be determined by comparing the displacement measurements of both strain sensitive optical fibers 3, 5 spanned between flow tube measurement location 8, 9 and the fixed world 7. In a one embodiment, the phase difference between the oscillatory signals obtained from the two strain-sensitive fiber sections will be recorded and used for determining the mass flow rate through the pipe section. Additionally, or alternatively, amplitude data of the oscillatory signals can be used for determining flow data. In principle, the strain sensitive optical fibers can be fixed at other locations of the flow tube, e.g. depending on a geometry of the flow tube.

A first displacement sensor can thus be used for measuring a displacement at a first location of the flow tube while a second displacement sensor can be used for measuring a displacement at a second location of the flow tube. Then, absolute displacement measurements are obtained. Absolute displacement measurements can be used to obtain relative displacement measurement data, for retrieving flow data and/or mass density data. Further, a displacement sensor can be used for sensing a relative displacement directly. Then, the sensor is arranged for sensing a displacement of a first location on the flow tube relative to a second location on the flow tube. Generally, amplitude data and/or frequency/phase data of displacements are measured for further processing.

In the shown embodiment, the two FBG fibers 3, 5 are integrated in different transmission fibers 4, 6. However, generally, multiple strain sensitive optical fibers can be integrated in a single transmission fiber. When the strain sensitive spectra of the strain sensitive optical fibers are different, the displacement measurements can still be performed using a single transmission fiber, for example by scanning one or more wavelength ranges within which spectral features such as peaks or dips in the transmission or reflection are tracked.

Figure 3:
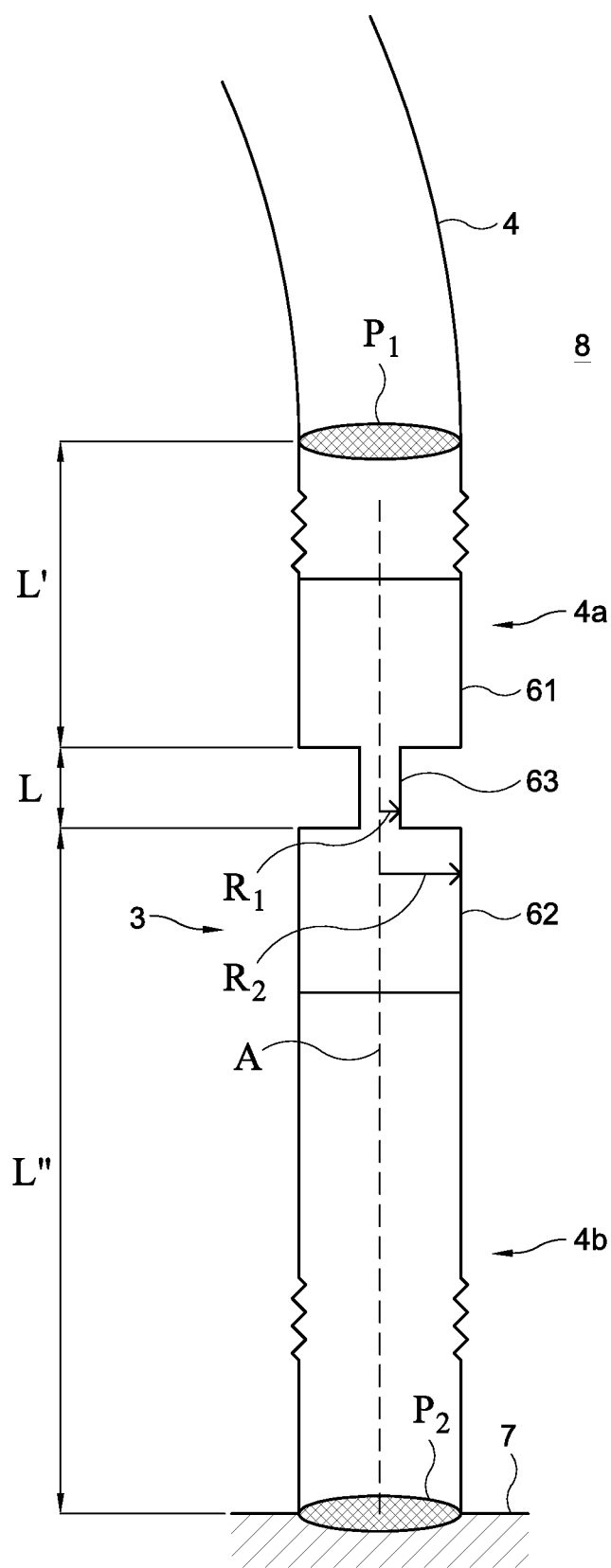
FIG. 3 shows a detailed schematic view of a specific strain sensitive optical fiber in the device of FIG. 2.

FIG. 3 shows a detailed schematic view of a specific strain sensitive optical fiber 3 in the device 70. Here, the strain sensitive optical fiber 3 is implemented in a specific way. The strain sensitive optical fiber 3 has a strain sensitive section 63 having a length L and two sections 61, 62, adjacent to ends of said strain sensitive section 63. The diameter $R_1$ of the strain sensitive section 63 is smaller than the diameter $R_2$ of an adjacent fiber section 62, preferably smaller than the diameter of both adjacent fiber sections. By providing the strain sensitive part in a fiber section having a reduced diameter, the sensitivity of the displacement sensor increases significantly since the stretching effect is focused in the section having the reduced diameter. Preferably, the length L of the strain sensitive section 63 is relatively short to optimally benefit from the increase in measurement sensitivity. The strain sensitive section 63 is spanned between a fixation point P1 on the tube 8 and a fixation point on the fixed world 7 via a first optical fiber 4a having a length L' and a second optical fiber 4b having a length L", respectively. The first and second optical fiber 4a,b have the diameter $R_2$ of the adjacent fiber sections 61, 62. Generally, the sensitivity increases by a factor that is mainly equal to the total length of the fiber between the fixation point on the tube P1 and the fixation point P2 on the fixed world 7, i.e. L'+L"+L divided by the length L of the strain sensitive section 63, if R1 is considered to be smaller than R2.

Figure 4:
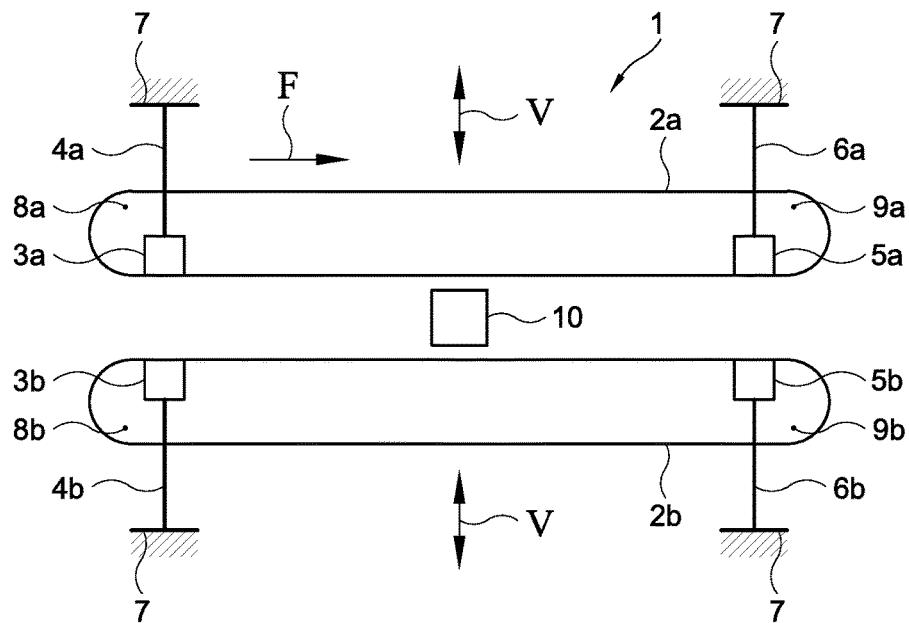
FIG. 4 shows a schematic view of a device according to a second embodiment of the invention.

FIG. 4 shows a device according to a second embodiment of the invention. Here, the Coriolis flow meter 1 includes two flow tubes 2a, 2b, also called pipes, arranged in parallel. Each of the flow tubes ends is fixed to a first end of an FBG fiber 3a, 3b, 5a, 5b for measuring displacements. The other FBG fiber ends are connected to the fixed world 7, similar to the measurement set-up shown in FIG. 2. Again, each of the FBG fibers is integrated in a corresponding transmission fiber 4a, 4b, 6a, 6b. Alternatively, a particular transmission fiber may include a multiple number of FBG fibers. As an example, the FBG fibers at corresponding ends of the flow tubes 2a, 2b, e.g. the FBG fibers 3a, 3b at a first measurement location 8a, 8b, at the left hand side, can be integrated in a single transmission fiber 6. The actuator 10 forcing the flow tubes 2a, 2b into vibration is now explicitly shown. In an exemplary embodiment, shown in more detail in FIG. 1, the system 1 includes two U-shaped tubes with equal flow rates in parallel direction. The vibration actuator 10 forms an active drive forcing the two tubes to vibrate in opposite directions in the elbow of the U-shape of the tubes, respectively. The measurement points are at two parallel locations, upstream and downstream to the vibration locations, i.e. before and behind the bend in the U-shape. Said parallel measurements points correspond to the first and second measurement locations 8, 9 of the tubes in FIG. 2.

Generally, a strain sensitive optical fiber can be arranged for sensing absolute displacements, i.e. relative to the fixed world, or for sensing relative displacements, e.g. a distance between corresponding parts of the flow tubes. The sensing fiber is preferably positioned spanning the displacement distance to be measured, such that vibrations in the tube will be detected as changes in sensing a fiber length. The change in length can be measured using the FBG directly.

In a preferred embodiment, the stretching of the fiber is monitored remotely using an optical interrogator with a wavelength-swept laser source such that the accurate recordings of changes in the reflection wavelength of the FBG is used as indication of the pipe vibration at the fiber location and phase difference between vibrations at two or more locations are indicative of the mass flow rate in the pipe.

Furthermore, the (resonant) vibrational frequency of the pipe, also recorded with the same fiber sensing scheme, can be used as information on the fluid density. This information can then be used in calculating the volume flow rate, in addition to mass flow rate. The use of optical detection scheme allows for high frequency measurements to be made from remote locations without signal cross-talk between sensors or the actuation scheme and as such allows for very accurate determination of the fluid density.

Figure 5:
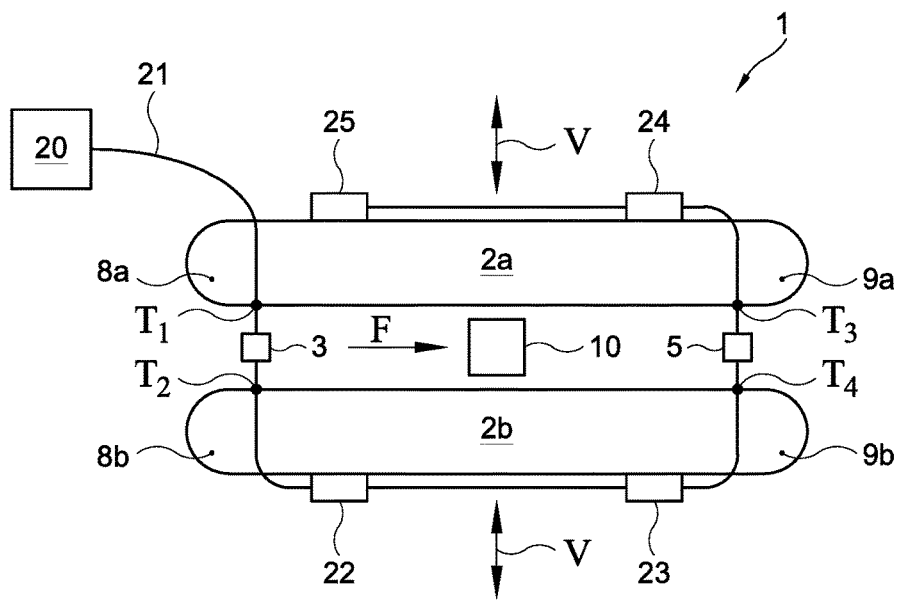
FIG. 5 shows a schematic view of a device according to a third embodiment of the invention.

FIG. 5 shows a device according to a third embodiment of the invention. Here, a relative displacement between first ends 8a, 8b, at the left hand side, of the individual flow tubes 2a, 2b is measured using a single FBG fiber 3 connected to the tubes at fixations points T1, T2, T3, T4. Then, the sensor is arranged for sensing a displacement of a first location on the flow tube relative to a second location on the flow tube. Similarly, a displacement between second ends 9a, 9b, at the right hand side, of the individual flow tubes 2a, 2b is measured using another FBG fiber 5. The FBG fibers 3, 5 are integrated in a single transmission fiber 21. The two sensing fiber regions are on one fiber with wavelength multiplexed gratings that can be interrogated at the same time. As explained in more detail below, the single transmission fiber 21 also includes one or more FBGs whose wavelengths are used as an indication of the temperature in the flow containing pipe or the surroundings for generating additional and/or more accurate information about the fluid or compensation of external effects.

The system further comprises a control unit 20 that is arranged for scanning a spectrum of the FBG fibers 3, 5, for the purpose of measuring the tube displacements. Preferably, the control unit 20 is a high speed high accuracy wavelength swept interrogator system. The spectrum can be scanned by applying a transmission measurement and/or a reflection measurement. Alternatively, the control unit is arranged for measuring an optical path length change as is described in more detail referring to FIG. 6.

Further, the control unit can be arranged for triggering the start and/or termination of the actuator operation. The control unit can also be arranged for determining a relative displacement of a first location on the flow tube relative to a second location on the flow tube, e.g. based on absolute displacement measurements.

In the embodiment shown in FIG. 5 the system 1 is further provided with two accelerometers 22, 24 attached to a respective flow tube 2a, 2b, and with two temperature sensors 23, 25 attached to a respective flow tube 2a, 2b. By using an accelerometer, a vibration in the oscillating flow tubes and/or an external vibration can be detected so that a compensation can be provided for external interferences, enabling higher accuracy and improved resolution. Similarly, by measuring a temperature, thermal effects both on the measurement and/or the fluid properties can be compensated. Especially, one or more FBG(s) can be used to detect temperature in close proximity to cancel out thermal effects on the FBGs used for detection of the flow tube vibrations.

Apparently, the system may also be provided with more or less accelerometers and/or temperature sensors, e.g. four accelerometers and three temperature sensors. Further, the system may be implemented without an accelerometer or without a temperature sensor. Advantageously, the accelerometers have been implemented as fiber optic accelerometers and the temperature sensors have been implemented as fiber optic temperature sensors. Then, the accelerometers and temperature sensors can be integrated in the transmission fiber 21 that also includes the FBGs 3, 5, so that a single transmission fiber can be used for measuring displacements, vibration and temperature. By applying a fiber temperature sensor having temperature sensitivity at other grating wavelengths than the further sensors, the temperature can be sensed without interference of other fiber measurements. The same applies to fiber optic accelerometers. Alternatively, the accelerometers and/or temperature sensors are integrated in other transmission fibers for separate scanning purposes, or implemented with another technology, e.g. using electronics.

As an alternative to measuring a fiber length change using a strain sensitive optical fiber, it is also possible to arrange a displacement sensor for measuring an optical path length change. By applying an interferometric measurement approach a change in distance between the tubes can be determined. Several interferometric schemes can be applied.

In a first interferometric measurement setup a similar configuration as shown in FIG. 5 can be applied provided that the FBG fibers 3, 5 are replaced by regular optical fibers bounded by reflecting elements at the fixation points T1, T2, T3, T4 on the tubes 8a,b, 9a,b. Fabry-Perot interferometry can be used whereby an effective optical cavity is formed between said reflecting elements, e.g. implemented as FBGs of partial reflectivity and sufficient overlapping reflection spectra at the tube fixation points T1, T2, T3, T4, such that the interference spectra of at least two reflections or transmissions from the at least 2 FBGs result in an accurate indication of the distance between opposite fixation points T1, T2, T3, T4 on the respective tubes allowing for accurate measurements of local motion of the pipe. Here, the FBGs are not employed as direct strain sensors but as partially reflective mirrors with specific reflection wavelengths such that a gap between the FBGs is measured interferometrically. In the shown example, a first FBG is attached at the first fixation point T1 of the first tube 2a while a second FBG is attached at the first fixation point T2 of the second tube 2b. The first and second FBG are interconnected using a regular optic fiber to enable an interferometric measurement. A similar setup at the other ends 9a, 9b of the tubes can be applied, allowing for a second measurement point for the pipe and the at least two oscillatory measurements can be analyzed for determining the amplitude and phase of the pipe vibrations to calculate the mass flow and density. Multiple measurement sections between pairs of FBGs are integrated in the same transmission fiber 21, each section being individually interrogated with wavelength or time multiplexing. Alternatively, a multiple number of transmission fibers can be applied, each transmission fiber including a single pair of FBGs. A combination of direct FBG interrogation and interferometric measurements can also be implemented.

Figure 6:
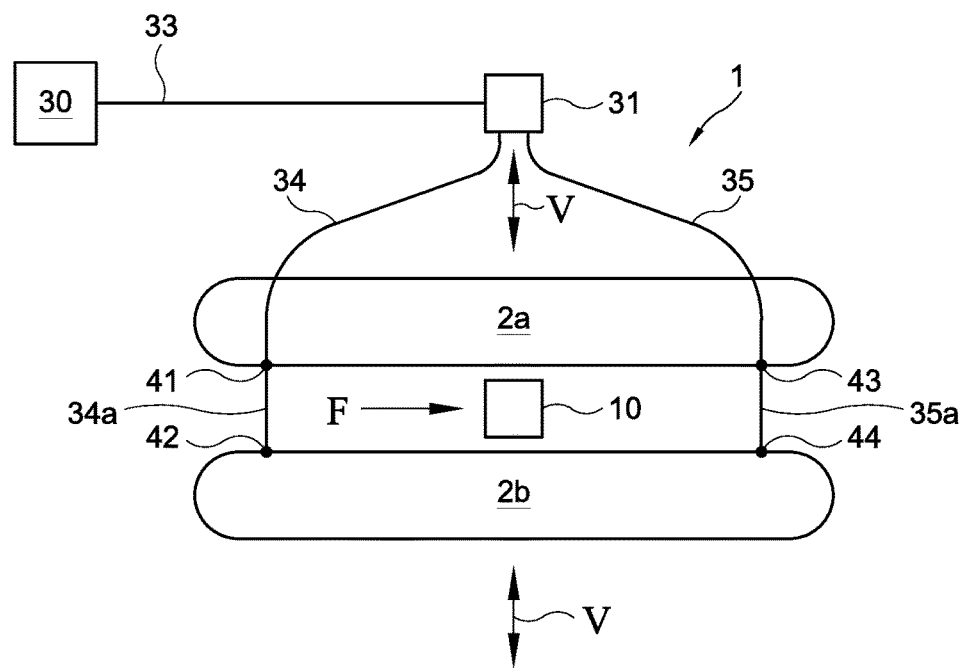
FIG. 6 shows a schematic view of a device according to a fourth embodiment of the invention.

In a second interferometric measurement configuration, a Mach-Zehnder interferometry is used. FIG. 6 shows a schematic view of a device according to a fourth embodiment of the invention. Here, the flow meter includes a transmitting unit 30, an optical splitter 31 and a first fiber 33 interconnecting the transmitting unit 30 with the splitter 31. Further, the splitter 31 is arranged for analyzing a phase difference of reflected signals. The flow meter also includes two parallel fibers 34, 35 that are each connected to both tubes 2a, 2b at different measurement locations 41, 42; 43, 44. The length of a fiber section 34a, 35a of the parallel fibers 34, 35 between the measurement connections 41, 42, 43, 44 on the tubes 2a, 2b varies depending on the time dependent location of the tube locations connected to the fiber sections 34a, 35a. During operation, an incoming light beam from the first fiber 33 is split up and propagates through the two parallel fibers 34, 35 connected to the two parts of the vibrating flow pipe. After reflection at the end of the parallel fibers 34, 35, the beams are re-combined at the splitter 31 for analysis of their phase difference, in interrogator unit 30 preferably in remote location, such that a change in path length difference between the two fiber sections 34a, 35a is accurately measured by the interfered light. In a preferred embodiment the light intensity ratio between the split lines are equal, but can also be adjusted based on different conditions. Advantageously, the steps of sending the light beam and analyzing a phase difference of optical signals can be performed in a single unit 30. Further, a high sensitivity to changes in optical path length changes is obtained since the light beams propagate through the parallel fibers 34, 35 twice. In yet a further embodiment, the reflections from the end of the fibers can be achieved by use of Fiber Bragg Gratings with identical and sufficiently broadband reflection properties, located on unstrained sections after 42 and 44, preferably in close proximity thereto. The use of FBGs allows for integrated mirrors in the fibers that allow for enabling of wavelength multiplexing. In an alternative embodiment, the flow meter further includes a phase analyzing unit connected to ends of the two parallel fibers 34, 35 so that the light beams propagating in the two parallel fibers 34, 35 are combined in said phase analyzing unit for measuring a change in path length difference. The analysis unit may in certain situations be the same unit as 30 or a different unit.

Figure 7:
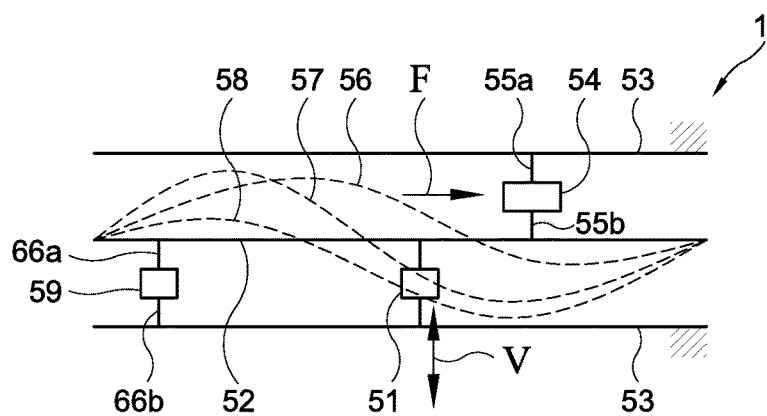
FIG. 7 shows a schematic view of a device according to a fifth embodiment of the invention.

FIG. 7 shows a schematic view of a device 1 according to a fifth embodiment of the invention. Here, the device 1 includes a tube 52 and a vibrating actuator 51 vibrating the flow tube 52 in a direction V transverse to the flow direction F. The device 1 further includes a fixed world 53 on opposite sides of the flow tube 52. The actuator 51 is arranged for inducing the tube to vibrate relative to the fixed world 53. The actuator 51 causes a wobbling displacement of the flow tube 52. In FIG. 7, three wobbling positions 56, 57, 58 of the tube 52 at distinct time instants are shown. In the shown embodiment, the device includes a first displacement sensor implemented as a strain sensitive fiber 54 spanned between a first location on the tube 52 and the fixed world 53 using respective fibers 55a, 55b. Similarly, the device includes a second displacement sensor implemented as a strain sensitive fiber 59 spanned between a second location on the tube 52 and the fixed world 53 using respective fibers 66a, 66b. Then, the displacement of the flow tube 52 can be measured at two different locations to retrieve fluid parameters characterizing a fluid flow through the flow tube 52.

In principle, the displacement sensor can be implemented in another way, e.g. as described referring to FIG. 1-6.

Figure 8:
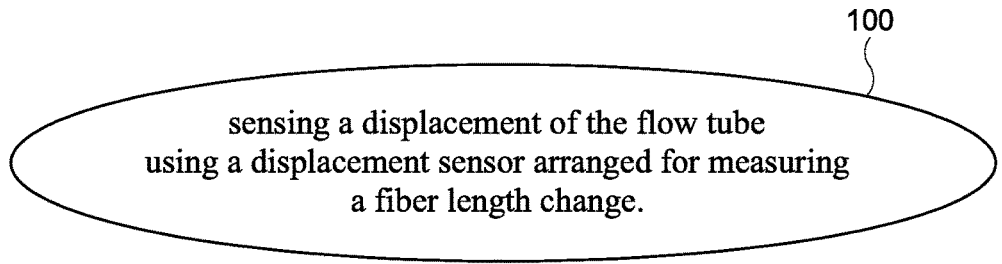
FIG. 8 shows a flow chart of an embodiment of a method according to the invention.

FIG. 8 shows a flow chart of an embodiment of a method according to the invention. The method 100 is used for measuring fluid parameters in a flow tube of a Coriolis flow meter. The method comprises a step of sensing a displacement of the flow tube using a displacement sensor, wherein the displacement sensing step includes measuring a fiber length change.

Figure 9:
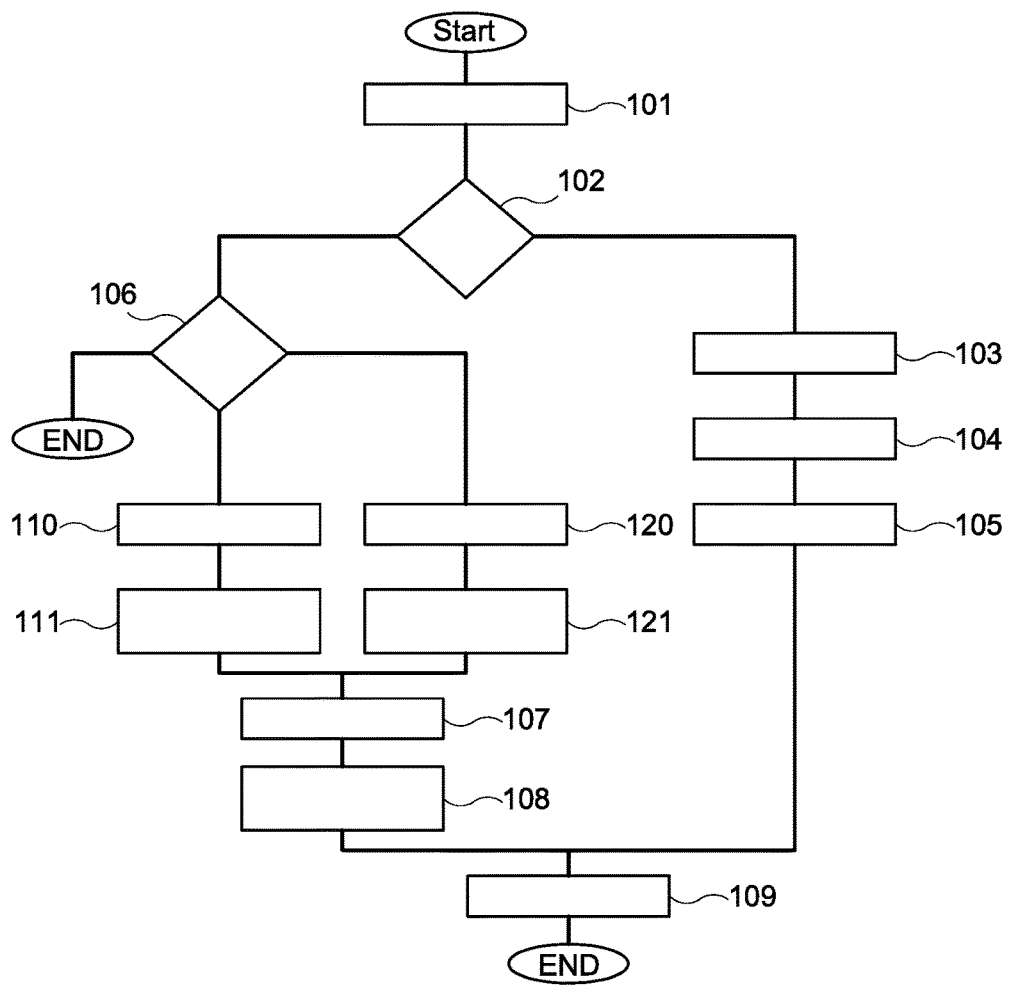
FIG. 9 shows a flow chart of method according to a second embodiment of the invention.

FIG. 9 shows a flow chart of an embodiment of a method according to the invention. The method measures fluid parameter(s) being mass flow, density flow and/or volume flow by using the Coriolis effect.

Step 101 includes forcing the flow tube of the Coriolis flow meter into vibration and/or rotation. In this embodiment vibrations are induced in the flow tube. At step 102 it is determined by a first decision operation whether mass flow or density is to be measured.

For determining mass flow, a step 103 of sensing a displacement of the flow tube using a displacement sensor wherein the displacement sensing step includes measuring a fiber length change includes measuring displacement between a first location on the flow tube relative to a second location on the flow tube is performed. In step 104 the sensed displacement is correlated to determine a mass flow parameter in step 105 on the basis of the measured relative displacement.

A second logical operator 106 determines if density is to be determined. If density is to be measured there are two options for performing such measurement.

In the first case, the method proceeds to step 110, which includes ceasing to force the flow tube into vibration and/or rotation. In step 111 the ringdown frequency is determined on the basis of the sensed displacement of the flow tube using the displacement sensor, wherein the displacement sensing step includes measuring a fiber length change.

In the second case the method proceeds to step 120. In this step, for each predetermined frequency of a plurality of predetermined frequencies, the flow tube is forced into vibration and/or rotation at the predetermined frequency. Next the displacement of the flow tube is sensed using a displacement sensor. The displacement sensing step includes measuring a fiber length change. This is repeated for each predetermined frequency of the plurality of predetermined frequencies. In step 111 then predetermined frequency at which the displacement of the flow tube was at its maximum is determined. This is referred to as the highest amplitude or peak amplitude.

The determined frequency from steps 110 and 111 and/or the determined frequency from step 120 and 121 is correlated in step 107 resulting in the determination of the density in step 108. It will be clear the density may be determined by the branch including steps 110, 111, 107 and 108, and/or by the branch including steps 120, 121, 107, and 108.

Once density and mass flow rate are known, volume flow may be determined in step 109 on the basis of these measurements.

The method of measuring fluid parameters in a flow tube of a Coriolis flow meter can be performed using dedicated hardware structures, such as FPGA and/or ASIC components. Otherwise, the method can also at least partially be performed using a computer program product comprising instructions for causing a processor of a computer system or a control unit to perform the above described step of the method according to the invention, or at least a sub-step of measuring a fiber length change.

All steps can in principle be performed on a single processor. However, it is noted that at least one sub-step can be performed on a separate processor. A processor can be loaded with a specific software module. Dedicated software modules can be provided, e.g. from the Internet.

The invention is not restricted to the embodiments described herein. It will be understood that many variants are possible.

These and other embodiments will be apparent for the person skilled in the art and are considered to fall within the scope of the invention as defined in the following claims. For the purpose of clarity and a concise description features are described herein as part of the same or separate embodiments. However, it will be appreciated that the scope of the invention may include embodiments having combinations of all or some of the features described.

The invention claimed is:

1. A device for measuring fluid parameters comprising:
   a Coriolis flow meter, comprising a flow tube, an actuator forcing the flow tube into vibration and rotation and a displacement sensor for sensing a displacement of the flow tube, wherein the displacement sensor is arranged for measuring an optical fiber length change.

2. The device according to claim 1, wherein the displacement sensor comprises a strain sensitive optical fiber, wherein the strain sensitive optical fiber is one of a Fiber Bragg Grating (FBG) fiber, a multicore fiber, a birefringent fiber, a distributed sensing fiber or a fiber laser.

3. The device according to claim 2, wherein the strain sensitive section of the optical fiber has a diameter that is smaller than the diameter of the optical fiber at adjacent sections.

4. The device according to claim 1, wherein the displacement sensor is arranged for measuring an optical path length change.

5. The device according to claim 4, wherein the displacement sensor includes a Fabry-Perot interferometer configuration or a Mach-Zehnder interferometer configuration.

6. The device according to claim 1, wherein the displacement sensor includes an optical fiber that is fixed to an exterior wall of the flow tube.

7. The device according to claim 1, comprising a first displacement sensor for measuring a displacement at a first location of the flow tube, and a second displacement sensor for measuring a displacement at a second location of the flow tube.

8. The device according to claim 1, wherein the displacement sensor is arranged for sensing a displacement of a first location on the flow tube relative to a second location on the flow tube.

9. The device according to claim 1, comprising two flow tubes.

10. The device according to claim 9, wherein the displacement sensor is arranged for sensing a distance between corresponding parts of the flow tubes.

11. The device according to claim 1, wherein the strain sensitive optical fiber is provided with a fiber optic accelerometer, a pressure sensor and a temperature sensor attached to the flow tube.

12. The device according to claim 1, wherein a multiple number of strain sensitive optical fibers are integrated in a single fiber.

13. A system for measuring fluid parameters, comprising:
a device comprising:
    a Coriolis flow meter, comprising a flow tube, an actuator forcing the flow tube into vibration and rotation; and
    a displacement sensor for sensing a displacement of the flow tube, wherein the displacement sensor is arranged for measuring an optical fiber length change; and
    a control unit arranged for scanning a spectrum of the strain sensitive optical fiber or measuring an optical path length change.

14. The system according to claim 13, wherein the control unit is configured for determining a relative displacement of a first location on the flow tube relative to a second location on the flow tube.

15. The system according to claim 13, wherein the control unit is configured for triggering the start and termination of the actuator operation.

16. A method for measuring fluid parameters in a flow tube of a Coriolis flow meter, the method comprising:
    forcing, at the Coriolis flow meter, flow tube into vibration and rotation;
    measuring a fiber length change; and
    sensing a displacement of the flow tube based at least in part on the fiber length change.

17. A non-transitory computer readable medium storing instructions, which when executed by a processor causes the processor to:
    control a Coriolis flow meter to force a flow into vibration and rotation;
    measure a fiber length channel; and
    sense a displacement of the flow tube based at least in part of the fiber length change.

18. The device according to claim 1, wherein the displacement sensor includes a strain sensitive optical fiber interconnected between a portion of the flow tube on a first side and the fixed world or a corresponding portion of another flow tube on a second side.

19. The device according to claim 1, wherein the displacement sensor is configured to detect an oscillation frequency of the flow tube at the displacement of the flow tube.

* * * * *